Aug. 28, 1945.  F. M. M. B. SALOMON  2,383,516
OSCILLATION REDUCING DEVICE
Filed Aug. 16, 1939  2 Sheets-Sheet 1
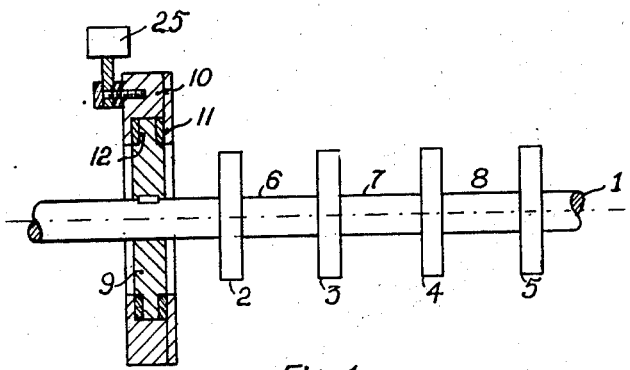
Fig. 1
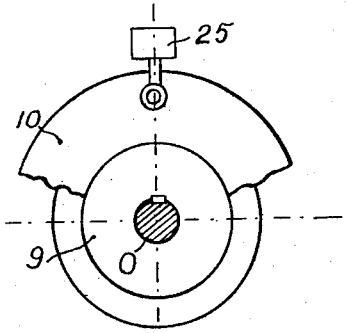
Fig. 2
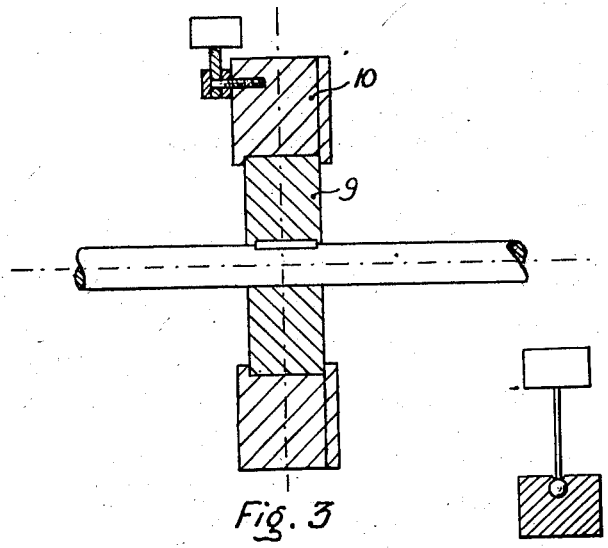
Fig. 3
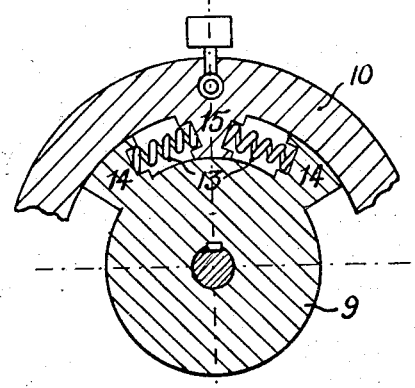
Fig. 4
Fig. 4a
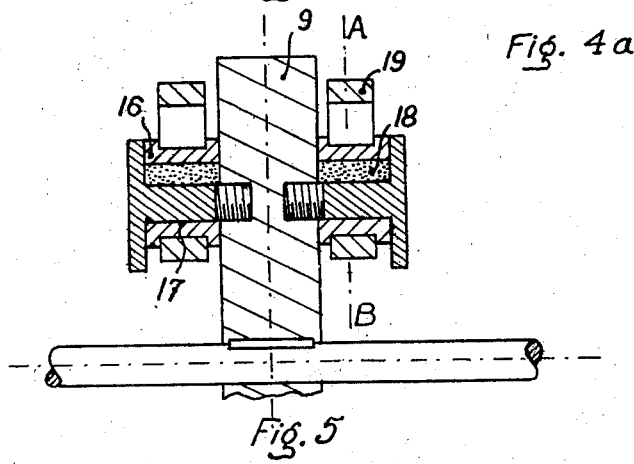
Fig. 5
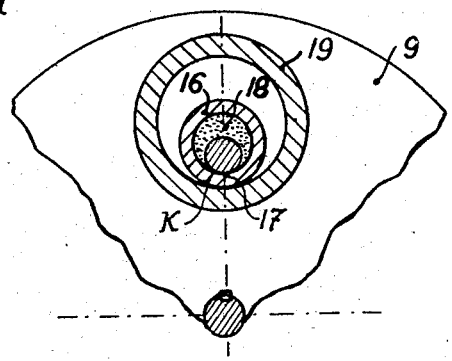
Fig. 6.
INVENTOR
Francois Marie Michel Bernard Salomon
BY
F. Bascom Smith
ATTORNEY Aug. 28, 1945. F. M. M. B. SALOMON 2,383,516
OSCILLATION REDUCING DEVICE
Filed Aug. 16, 1939 2 Sheets-Sheet 2

INVENTOR
Francois Marie Michel Bernard Salomon
BY
F. Bascom Smith
ATTORNEY

Patented Aug. 28, 1945

2,383,516

UNITED STATES PATENT OFFICE 2,383,516

OSCILLATION REDUCING DEVICE

François Marie Michel Bernard Salomon, Paris, France; vested in the Alien Property Custodian Application August 16, 1939, Serial No. 290,433
In Luxemburg August 17, 1938

19 Claims. (Cl. 74—574)

It is known to use devices which employ, in particular for reducing the vibrations of the shafts of machines, movable auxiliary masses that may be of the most varied shapes, such as fly-wheels or plates which are centered or not centered on the shaft, centrifugal masses that are independent or centered on the shaft, etc., the movements of said masses being furthermore damped by various means.

This damping may be obtained, for example, by the friction of solid surfaces on solid surfaces, or by using fluids, or even by other means, such as electrical means. On the other hand, springs or various resilient substances, that may even be fluid, may furthermore be used, either for providing elastic couplings on the shafts, or for producing retracting moments on the auxiliary oscillating masses. Hereinafter, these systems will be called for short: "Systems of the first type."

On the other hand, a second type of devices for reducing speed oscillations and vibrations has been used, which devices are particularly applicable to machine shafts and are characterized by the use of auxiliary masses which are completely free on their guideways, involve very slight friction, and are subjected solely to the action of the disturbing forces and to the retracting action of the centrifugal forces. The natural period of oscillation of these centrifugal masses is preferably tuned to that of the periodic disturbing forces to be compensated, and may in particular be equal to it.

The present invention has for its object combinations of the systems of these two types; it being of course understood that it does not involve simply a juxtaposition, but a real combination, as will be seen hereinafter.

The technical advantage of this combination is a question of species and it may happen that the system of the second type with as little friction as possible on the auxiliary masses are preferable to the "combined" systems.

But, in certain cases, these systems with free masses may per se possess properties which vary too quickly with their constructional peculiarities, and very small differences in such peculiarities due, for example, to possible errors in machining, completely modify the properties of the oscillation reducer. In this case it is advantageous to use the devices which are the object of the present invention and in which the action of the devices of the first type (involving frictional damping devices and optionally the use of springs or resilient substances) enables, in certain cases, the acuteness of the characteristic curves of the complete system to be reduced.

Under these conditions, given differences in the constructional features may be of less importance. In particular, a greater variation in the natural period of centrifugal pendulums of the second type may become acceptable, without the properties of the whole arrangement being substantially altered.

It must be carefully noted that the fact that this combination may be advantageous in certain cases, in no way changes the technical importance of the systems with free centrifugal masses (second type), quite to the contrary, since they are still very advantageous in combination with the systems of the first type, and in other cases moreover, as already stated, it may be more advantageous to use them alone.

Other advantages and peculiarities of the invention will become apparent from the ensuing description taken in conjunction with the accompanying drawings which show diagrammatically and merely by way of example, several embodiments of the invention and in which:

Fig. 1 shows diagrammatically a vertical section of an embodiment of the device according to the invention, fitted on a crankshaft of a straight 4-cylinder heat engine.

Fig. 2 is a front view of same.

Figs. 3 and 4 show respectively side and front sectional elevations of another embodiment.

Fig. 4a is a diagrammatic detail view, partly in section and with parts broken away, illustrating one form of conical or spherical pendulum which may be employed in carrying out the invention.

Figs. 5 and 6 show respectively side and front sectional elevations of the vibration reducing device according to the invention, the section of Fig. 6 being taken along the line A—B of Fig. 5.

Figure 7:
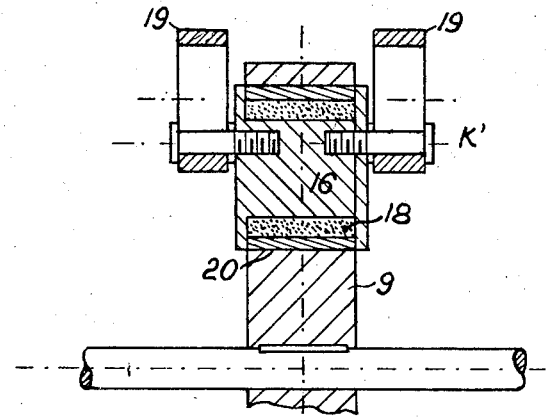
Figs. 7 and 8 show respectively side and front sectional elevations of a modification of the device of Figs. 5 and 6.

Referring to Figs. 1 and 2, O is the axis of the shaft 1; 2, 3, 4, 5 the moments of inertia equivalent to the movable parts of the 4 cylinders; 6, 7, 8 the elasticities which are equivalent to the corresponding fractions of the shaft.

On the shaft 1 is keyed a plate 9 on which is centered a ring 10 with a possibility of relative movement. The relative movement may involve a certain amount of friction of the surfaces 11 of the member 10 on the surfaces 12 of the member 9. These various surfaces may, in particular, be coated with plastic or fibrous substances.

In fact, the arrangement of the members 9 and 10 does not differ, in principle, from the damping devices of the type known by the name of Lanchester, and like devices.

The inventor has shown, in particular in his U. S. Patents Nos. 2,103,643 and 2,029,796 and in his co-pending application Serial No. 149,775, filed June 22, 1937 (now Patent No. 2,181,610), that by mounting suitably constructed centrifugal pendulums on a rotating member, it is possible considerably to increase in absolute value, relatively to a given harmonic, the magnitude of the apparent moment of inertia of said rotating member.

He has also shown that, by suitably constructing the centrifugal pendulums, it is possible to give the rotating member, relatively to a given harmonic, a finite or infinite positive or negative apparent moment of inertia whereof the value is appropriate to each case of application.

More particularly, the pendular masses which are mounted on the member in question move absolutely freely and without damping, without there being retraction by means of a spring, and with the sole retracting action of the centrifugal forces; the properly is in this case independent of the speed of rotation of the shaft.

Finally, the inventor has stated in his aforesaid prior patents, what conditions have to be fulfilled from a constructional standpoint as regards the natural periods of the centrifugal pendulums.

Fig. 2 shows a front view of the vibration damping device of Fig. 1.

According to Fig. 4, the "coupling" between the member 10 (ring, disc, etc.) and the plate 9 is effected by means of a resilient device that has been shown diagrammatically as springs 13, but this resiliency could be obtained in other ways, in particular by using any resilient substances, such as natural or synthetic rubber.

In Fig. 4, the disc 9 is provided with shoulders 14 and the ring 10 carries feet such as 15; springs such as 13 connect 14 to 15.

A centrifugal pendulum 25 has been shown diagrammatically, which is similar to that of Fig. 1 and to which the same remarks apply as in the case of Fig. 1.

Fig. 3 shows a sectional side elevation of the device of Fig. 4.

The devices of Figs. 1, 2, on the one hand, and 3, 4 on the other hand, comprise as a whole, a first member 10 coupled to an oscillating member 9 by resilient or damping parts, and a system of oscillating masses, mounted on 10, which are not subjected to resilient or damping actions, but to the sole retracting action of the centrifugal forces.

Furthermore, the member 10 is concentric with the rotary shaft and is not subjected to the retracting action of the centrifugal forces.

It may often be advantageous to use, as a member 10 "coupled" to the rotating shaft, a system which is eccentric relatively to the axis of the shaft and which is itself subjected to the retracting action of the centrifugal forces, at the same time as optionally to damping actions and, optionally to resilient actions. This is the case in the subsequent figures.

In Fig. 6, the first member, which is directly coupled to the vibrating shaft and performs the function of the member 10, is a centrifugal mass 16 capable of oscillating by rolling on a roller track 17 formed by a cylinder of which the centre is K and which is fixed in the plate 9.

Figure 11:
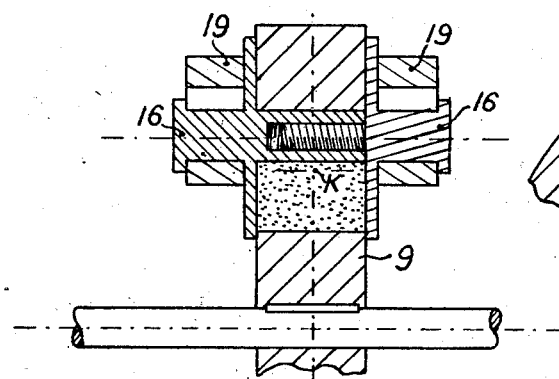
Figs. 11 and 12 show respectively side and front sectional elevations of another modification.

In Fig. 6 said roller track is convex, but it would also be possible, by way of a modification, to use a concave roller track, as shown in Fig. 11, for example.

The mass 16, which may be of any shape, is a ring of revolution in Fig. 6.

The mass 16 is subjected to damping actions by means of any methods and, in particular, by means of methods which are known per se, for example by means of rubber 18.

To the mass 16 is coupled a mass 19 of the free oscillating and rolling centrifugal mass type, according to any variety of those now known, and in particular according to any variety of the known systems of double rolling oscillating centrifugal masses.

In Fig. 6, said mass 19 is formed by a ring of revolution which is capable of oscillating by rolling on a roller track carried by the mass 16.

Fig. 5 is a longitudinal view of the same device, whereof Fig. 6 shows a section through A—B.

Figure 8:
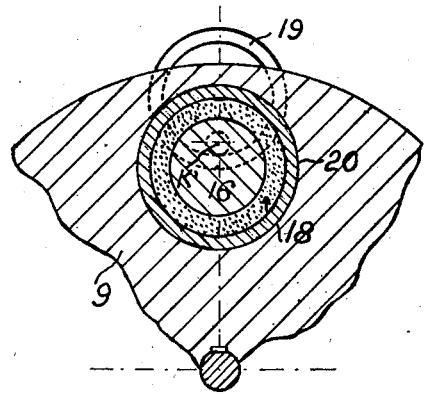

The general arrangements are the same in Figs. 7 and 8, but the damping action is exerted on the mass 16 by a resilient substance and, optionally, by a substance which is both resilient and damping, shown at 18. This substance, which may in particular be natural or synthetic rubber or a like substance, is enclosed between a ring 20, which is secured to the disc 9, and the mass 16.

On the other hand, the mass 16 carries a roller track which is formed by a pin, the eccentric axis of which is K' and on which the free centrifugal mass 19 can oscillate.

The "coupling" between 16 and 19 may undergo the most extensive modifications and, for example, the roller track carried by 16 may be concave instead of being convex in accordance with the disclosure of U. S. Patent No. 2,103,643, for example.

Fig. 7 shows a longitudinal section of the embodiment of Fig. 8.

Figure 9:
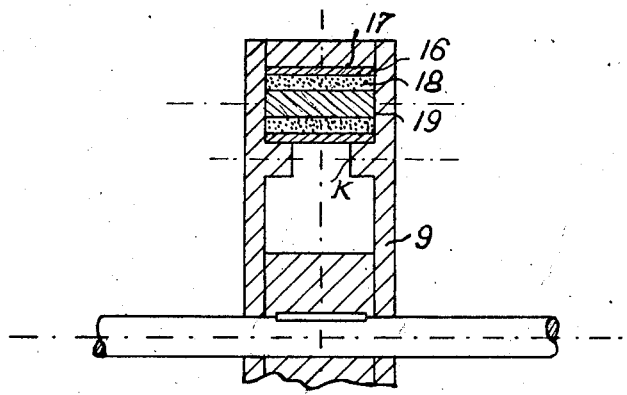
Figs. 9 and 10 show respectively side and front sectional elevations of a further modification of the embodiment of Figs. 5 and 6.
Figure 10:
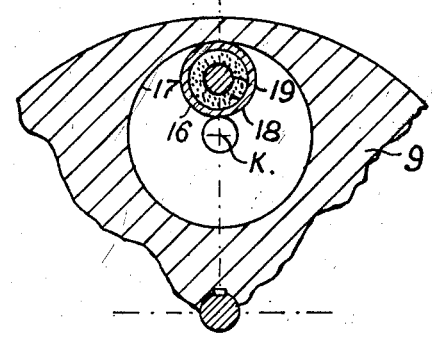

In Figs. 9 and 10, the mass 16 oscillates by rolling on the wall of the hole 17, the axis of which is K. A second mass 19 is "coupled" to the mass 16 by means of a resilient and damping substance 18.

Figure 12:
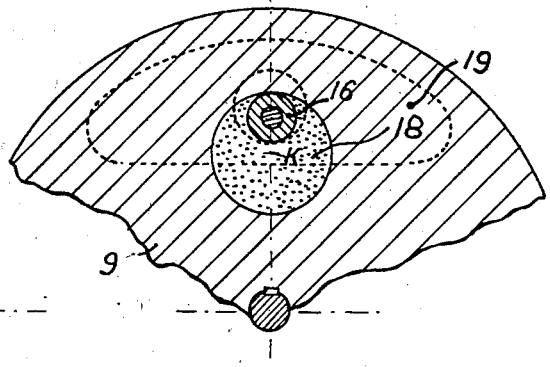

In Figs. 11 and 12, the mass 16 operates in a similar manner to the mass 16 of Figs. 9 and 10.

The hole, whereof the axis is K, is filled with a resilient material 18. The mass 19, which may be of the most varied shapes, oscillates by rolling on the mass 16.

It is known that, in the damping devices of the first type, of which the system formed by the plate 9 and the ring 10 which are coupled by friction is a diagrammatical example, there is in practice in each case an optimum value for the moment of inertia of the member 10 relatively to the axis of the shaft.

Let M be this value.

The inventor has shown on the other hand that the systems of oscillating centrifugal masses that he described in his aforesaid patents are equivalent to a finite or infinite positive or negative fictitious inertia, the value of which is $$\frac{\Delta}{\delta}$$

$\Delta$ and $\delta$ being certain determinants, $\Delta$ of the order $n+1$, $\delta$ of the order $n$, relatively to the linear equations which are satisfied by the system, within the usual approximations, and $n$ being the number of stages of the pendular system. According to the present invention, the pendular systems of the second type, such as the one which is diagrammatically shown in the example of Fig. 1 by the pendulums 25, or those which correspond to same in the other figures, are "tuned" in such a manner that $$\frac{\Delta}{\delta} = M$$

The devices which are the object of the present invention may be placed at any points of the vibrating members and, in the case of shafts, at the front, at the rear, or in the medial parts; in the case of crankshafts, they can be placed in the counterweights, or outside the shaft. In the case of radial aircraft engines, they can be mounted in the counterweights. The pendulums used may be of any type, with unifilar, bifilar, or multifilar suspension.

The invention has been particularly described for the case of reducing torsional oscillations, but the same principles apply in the case of reducing bending oscillations and in that of the simultaneous reduction of torsional and bending oscillations, as disclosed in my co-pending application Serial No. 177,226, filed November 30, 1937, for "Oscillation damping means" which is a divisional application based on U. S. Patent No. 2,103,643.

In the case of bending oscillations, the movements of the oscillating systems will generally be effected in planes containing the axis of the shaft which produces the centrifugal forces. Said shaft will frequently be the shaft whereof it is required to reduce the vibrations, but it could be another shaft which could be kept in rotation in any manner.

There may be any number of stages of oscillating rolling masses when systems of this type are used.

It is also possible to use multiple pendular systems having as high a degree of freedom as desired, without exceeding the scope of the present invention, and even although rolling masses were not used, but masses connected in any other manner, for example by means of pivotal connections, such as shown in U. S. Patent No. 2,181,610.

Finally, the oscillating systems coupled to the members corresponding to 10 could also, without exceeding the present invention, be provided with springs or resilient substances, either to act as abutments during reductions of speed, or to perform a complementary function.

Under the same conditions, they could be provided with a certain amount of damping by means of solid or fluid substances.

For simultaneously reducing bending and torsional oscillations, it is possible:

(a) Either to make certain masses oscillate in one or a plurality of planes perpendicular to the axis of rotation, and the others in one or a plurality of planes passing through said axis or parallel with same;

(b) Or to make the masses oscillate in one or a plurality of planes which are oblique with respect to the axis;

(c) Or to make at least a part of the masses oscillate like space pendulums which are sometimes also called spherical or conical pendulums, one suitable form of such a pendulum being illustrated in Fig. 4a wherein the pendulum is anchored by means of a universal joint.

The object of the invention is not limited to the case of rotary shafts and may be extended to any members of machines. The rotary shaft 1 may in that case be driven by any method whatsoever.

I claim:

1. A rotary machine member subjected to vibrations, carrying at least one roller track for at least one centrifugal mass that is capable of oscillating by rolling on the roller track while remaining in contact with a deformable substance, said centrifugal mass carrying, on the other hand, a roller track for at least one other centrifugal mass, capable of oscillating by rolling on the last mentioned roller track.

2. In combination, a machine member subjected to vibrations, a second member adapted to oscillate relative to said machine member in response to said vibrations, means connecting said members including resilient means for yieldably resisting relative movement thereof, and at least one pendular vibration damping mass carried by and freely oscillatable on said second member.

3. In combination, a rotatable machine member subjected to vibrations, a second member connected to said machine member and adapted to oscillate relative thereto in response to said vibrations, resilient means normally holding said second member in a predetermined position relative to said machine member and adapted to yieldably resist movement of the second member from said normal position relative to said machine member, and at least one freely oscillatable pendular mass carried by said second member.

4. In combination, a rotatable member, a damping mass carried by said member for movement relative thereto, resilient means for normally positioning said mass with respect to said member and for yieldably resisting relative movement of said mass and member, and at least one oscillatable damping mass carried by and freely oscillatable relative to said first-named damping mass.

5. In apparatus of the class described, a rotatable member, a damping mass carried by said member for movement relative thereto, said damping mass being subjected to the action of centrifugal forces created during rotation of said member, means for yieldably resisting movement of said mass from its normal position relative to said member during rotation of the latter and at least one freely oscillatable damping mass carried by but separate from said first-named damping mass.

6. In apparatus of the class described, a rotatable member, a damping mass carried by said member for movement relative thereto, means for yieldably resisting relative movement of said mass and member during rotation of the latter, and at least one oscillatable damping mass carried solely by said first-named damping mass and having pivotal contact therewith at only one place at any time, said second-named mass being subjected to the action of centrifugal forces created during rotation of said member.

7. In apparatus of the class described, a rotatable member, a damping mass carried by said member for movement relative thereto, deformable means interposed between said mass and member and having continuous contact therewith for yieldably resisting relative movement of said mass and member, an oscillatable damping mass carried by said first-named mass and adapted to roll freely on a roller track carried by said first-named mass.

8. In combination, a rotatable machine member, a damping mass mounted on said member for movement relative thereto, yieldable means for resisting relative movement of said mass and member during rotation of the latter, and at least one pendular damping mass carried by and oscillatable relative to said first damping mass.

9. In apparatus of the class described, a rotatable machine member, a yieldable substance carried by said member, a damping mass at least partially embedded in said substance, and a freely oscillatable pendular damping mass carried by said first-named mass.

10. In apparatus of the class described, a rotatable member, a pendular damping mass carried by said member, yieldable means for resisting oscillation of said damping mass relative to said member during rotation of the latter, and a freely swinging pendular damping mass carried by said first-named mass.

11. In combination, a rotatable member, at least two damping masses carried by said member and having direct interconnection with each other independently of said member, said masses being oscillatable relative to each other and said member and subject to the action of centrifugal forces created during rotation of said member, and means for continuously yieldably resisting at least a portion of the movement of one of said masses relative to said member without resisting movement of the other of said masses relative to said member.

12. In combination, a rotatable member, a plurality of interconnected damping masses carried by said member, said masses being directly interconnected with each other independently of said member and oscillatable relative to each other and said member and subject to the action of centrifugal forces created during the rotation of said member, and means continuously in contact with one of said masses for yieldably resisting at least some of the movement of the latter relative to said member without resisting relative movement between said member and another of said masses directly interconnected with said one of said masses.

13. In combination, a rotatable member, a plurality of interconnected damping masses carried by said member, said masses being directly interconnected with each other independently of said member and oscillatable relative to each other and said member and subject to the action of centrifugal forces created during the rotation of said member, movement of at least one of said masses relative to said member during rotation of the latter being substantially without friction and along a curved path, and means for continuously yieldably resisting at least a portion of the movement of the other of said masses relative to said member.

14. In combination, a rotatable member, a pair of interconnected damping masses carried by said member and oscillatable relative thereto, said masses being subject to the action of centrifugal forces created during the rotation of said member and adapted for movement relative to each other, one of said masses being directly connected to the other of said masses independently of said member and having free rolling movement relative to said member, and means for continuously yieldably resisting at least some of the movement of the other of said masses relative to said member.

15. In apparatus of the class described, a rotatable member subjected to vibrations, said member having at least one roller track thereon, at least one centrifugal mass capable of oscillating on said track, a deformable substance in continuous contact with said mass for resisting oscillation thereof, said mass having a roller track thereon, and at least one other centrifugal mass capable of oscillating on the last-mentioned roller track.

16. In apparatus of the class described, a rotatable member having a curved guideway eccentric with respect to the axis of rotation thereof, a damping mass engaging said guideway so that movement thereof in either direction along said guideway during rotation of said member is resisted by centrifugal forces, yieldable means for also resisting movement of said mass along said guideway, and at least one freely oscillatable damping mass carried by but separate from said first-named mass, oscillation of said second-named damping mass being resisted during rotation of said member by centrifugal forces.

17. In apparatus of the class described, a rotatable member having an external curved guideway thereon eccentric with respect to the axis of rotation thereof, an oscillatable damping mass carried by said member and having an internal guideway adapted to cooperate with said external guideway, deformable means for resisting oscillation of said mass relative to said member, and a second oscillatable damping mass having an internal guideway adapted to cooperate with an external guideway on said first-named mass.

18. In apparatus of the class described, a rotatable member having a curved guideway eccentric with respect to the axis of rotation thereof and means for damping vibrations of said member comprising a first mass responsive to centrifugal forces and oscillatable on said curved guideway, yieldable means for resisting oscillation of said first mass relative to said member, and a second oscillatable damping mass having a guideway thereon adapted to cooperate with a guideway on said first mass, oscillation of said second mass being resisted by centrifugal forces during rotation of said member.

19. In apparatus of the class described, a rotatable member having a curved guideway eccentric with respect to the axis of rotation thereof, an oscillatable damping mass responsive to centrifugal forces and having a curved guideway adapted to cooperate with said first-named guideway, yieldable means for resisting oscillation of said damping mass relative to said member, and a second oscillatable damping mass having a curved guideway thereon adapted to cooperate with a second curved guideway on said first-named mass, oscillation of said second mass being resisted by centrifugal forces during rotation of said member, and the radii of curvature of the guideways on said member and said second-named mass being different than the radii of curvature of the corresponding cooperating guideways on said first-named mass.

FRANÇOIS MARIE MICHEL
BERNARD SALOMON.